US012682821B2

(12) United States Patent
Lai et al.

(10) Patent No.: US 12,682,821 B2
(45) Date of Patent: Jul. 14, 2026

(54) DRIVER CIRCUIT, DISPLAY DEVICE AND DRIVING METHOD OF DISPLAY PANEL FOR SHARING SAME SOURCE DRIVER CHANNEL OF SOURCE DRIVER

(71) Applicant: Novatek Microelectronics Corp., Hsinchu (TW)

(72) Inventors: Chia-Cheng Lai, Tainan City (TW); Yi-Chin Lee, Tainan City (TW); Chih-Hao Chen, Kaohsiung City (TW)

(73) Assignee: Novatek Microelectronics Corp., Hsinchu (TW)

(*) Notice: Subject to any disclaimer, the term of this patent is extended or adjusted under 35 U.S.C. 154(b) by 0 days.

(21) Appl. No.: 19/079,374

(22) Filed: Mar. 13, 2025

(65) Prior Publication Data

US 2026/0087965 A1 Mar. 26, 2026

Related U.S. Application Data

(60) Provisional application No. 63/699,788, filed on Sep. 26, 2024.

(51) Int. Cl.
*G09G 3/20* (2006.01)

(52) U.S. Cl.
CPC ... *G09G 3/2092* (2013.01); *G09G 2310/0254* (2013.01); *G09G 2310/0275* (2013.01);
(Continued)

(58) Field of Classification Search
CPC ......... G09G 3/2092; G09G 2310/0254; G09G 2310/0275; G09G 2310/0297; G09G 2320/0242
See application file for complete search history.

(56) References Cited

U.S. PATENT DOCUMENTS 7,505,017 B1 * 3/2009 Yeo ...................... G09G 3/3688 345/87
9,041,703 B2 5/2015 Yen
(Continued)

FOREIGN PATENT DOCUMENTS

TW 200909831 3/2009
TW 201337874 9/2013
(Continued)

OTHER PUBLICATIONS

"Office Action of Taiwan Counterpart Application", issued on Feb. 9, 2026, pp. 1-10.

*Primary Examiner* — Kwang-Su Yang
(74) *Attorney, Agent, or Firm* — JCIPRNET

(57) ABSTRACT

Provided are a driver circuit, a display device and a driving method of a display panel thereof. The display device includes a source driver, a display panel, and a multiplexer. A common terminal of the multiplexer is coupled to an output terminal of a source driver channel of the source driver. The multiplexer includes a plurality of selection terminals, each coupled to a corresponding one of a plurality of data lines of the display panel. Each of the data lines has a corresponding color attribute. The color attributes of at least two of the data lines coupled to the multiplexer are a first color. The multiplexer selects each of the selection terminals once in a unit period. The multiplexer continuously selects the data lines with the same color attribute as the first color in the unit period.

24 Claims, 10 Drawing Sheets

(52) U.S. Cl.
CPC ............... *G09G 2310/0297* (2013.01); *G09G 2320/0242* (2013.01)

(56) References Cited

U.S. PATENT DOCUMENTS

| | | | | |
|---|---|---|---|---|
| 2007/0268233 | A1 * | 11/2007 | Hashimoto .......... | G09G 3/3688 345/100 |
| 2008/0024404 | A1 * | 1/2008 | Tanaka ................. | G09G 3/3648 345/87 |
| 2014/0009511 | A1 * | 1/2014 | Hsiao ................... | G09G 3/3614 345/89 |
| 2017/0358268 | A1 * | 12/2017 | Nishio ................. | G09G 3/2011 |
| 2018/0151145 | A1 | 5/2018 | Lee et al. | |
| 2022/0114935 | A1 | 4/2022 | Chang et al. | |
| 2023/0079091 | A1 | 3/2023 | Yuan et al. | |

FOREIGN PATENT DOCUMENTS

| | | |
|---|---|---|
| TW | 201403560 | 1/2014 |
| TW | 202215400 | 4/2022 |
| WO | 2022083313 | 4/2022 |
| WO | 2024163260 | 8/2024 |

* cited by examiner

DRIVER CIRCUIT, DISPLAY DEVICE AND DRIVING METHOD OF DISPLAY PANEL FOR SHARING SAME SOURCE DRIVER CHANNEL OF SOURCE DRIVER

CROSS-REFERENCE TO RELATED APPLICATION

This application claims the priority benefits of U.S. provisional application Ser. No. 63/699,788, filed on Sep. 26, 2024. The entirety of the above-mentioned patent application is hereby incorporated by reference herein and made a part of this specification.

BACKGROUND

Technical Field

The disclosure relates to an electronic device, and in particular to a display device and a driving method of a display panel thereof.

Description of Related Art

Generally speaking, a source driver includes multiple source driver channels. Each source driver channel is used to drive a single corresponding data line of the display panel. In other words, when the display panel has n data lines (n is a positive integer), the total number of the source driver channels of one or more source drivers needs to be greater than or equal to n. As the resolution of the display panel increases day by day, the number of data lines of the display panel increases. The increase in the number of the data lines means that the total number of the source driver channels is increasing, which in turn leads to the high cost of the display device.

SUMMARY

The disclosure provides a driver circuit, a display device and a driving method of a display panel thereof, so that multiple first data lines of the display panel share the same source driver channel of the source driver.

In an embodiment of the disclosure, the display device includes a source driver, a display panel, a first demultiplexer, and a controller. The source driver includes a first source driver channel. The display panel includes multiple first data lines corresponding to the first source driver channel. The first demultiplexer includes a common terminal and multiple selection terminals. The common terminal of the first demultiplexer is coupled to the output terminal of the first source driver channel. Each selection terminal of the first demultiplexer is coupled to a corresponding one of the first data lines. Each of the first data lines has a corresponding color attribute. The color attributes of at least two of the first data lines coupled to the first demultiplexer are a first color. The controller controls the first demultiplexer to select each of the selection terminals once in a unit period. The first demultiplexer continuously selects the first data lines with the first color in the unit period.

In an embodiment of the disclosure, the driving method includes: continuously selecting, by the first demultiplexer, the multiple first data lines with the same color attribute as the first color in a unit period, in which the common terminal of the first demultiplexer is coupled to the output terminal of the first source driver channel, each selection terminal of the first demultiplexer is coupled to a corresponding one of the multiple first data lines, and the color attributes of at least two of the first data lines coupled to the first demultiplexer are the first color.

In an embodiment of the disclosure, the driver circuit includes a source driver channel and a controller. The source driver channel is configurable to be coupled to a demultiplexer and output pixel data to the demultiplexer. The demultiplexer includes a plurality of selection terminals and is controlled to select each of the selection terminals once in a unit period. A group of pixel data including at least two pixel data of a first color is outputted to the demultiplexer in the unit period. The controller controls the demultiplexer to output the group of pixel data to data lines of a display panel. The demultiplexer is controlled to continuously output the pixel data of the first color to the data lines in the unit period.

Based on the above, the common terminal of the first demultiplexer in the embodiments of the disclosure is coupled to the output terminal of the first source driver channel, and each selection terminal of the first demultiplexer is coupled to a different data line. Based on the switching operation of the first demultiplexer, the multiple data lines of the display panel can share the same source driver channel of the source driver. Therefore, the total number of the source driver channels can be effectively reduced. In addition, the first demultiplexer continuously selects the multiple data lines with the same color attribute (such as the first color) in the same unit period to improve the uniformity of a single color image.

In order to make the foregoing features and advantages of the disclosure more comprehensible, embodiments are given below and described in detail with reference to the accompanying drawings.

DESCRIPTION OF THE EMBODIMENTS

Figure 1:
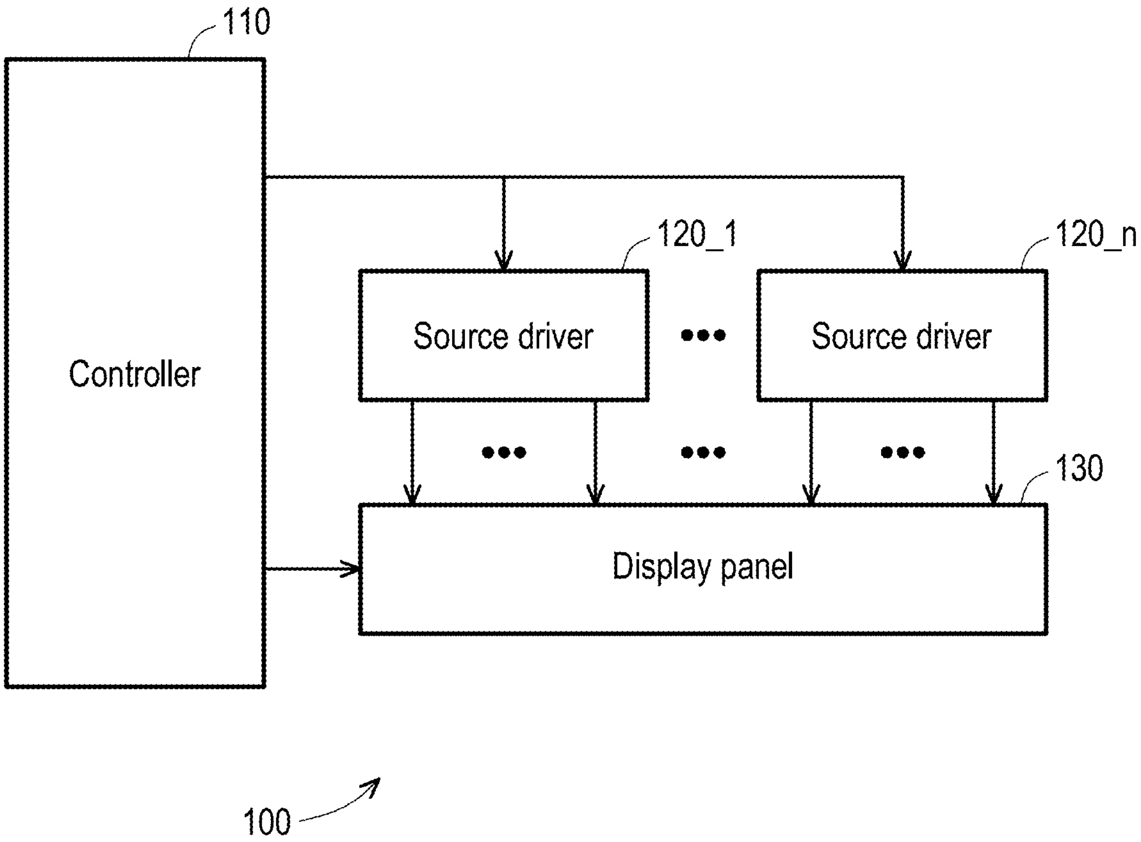
FIG. 1 is a circuit block schematic diagram of a display device according to an embodiment of the disclosure.

The word "coupled (or connected)" used throughout the specification of the disclosure (including the scope of the appended claims) may refer to any direct or indirect connection means. For example, if a first device is described as being coupled (or connected) to a second device, it should be interpreted as meaning that the first device may be directly connected to the second device, or that the first device may be connected indirectly to the second device through other devices or some connection means. The terms "first" and "second" used throughout the specification of the disclosure (including the scope of the appended claims) are used to name elements or to distinguish different embodiments or scopes, and are not used to limit the upper limit or lower limit of the number of elements, nor is it used to limit the order of elements. In addition, wherever possible, elements/components/steps with the same reference signs are used in the drawings and embodiments to represent the same or similar parts. Elements/components/steps using the same reference signs or using the same terms in different embodiments may refer to the relevant descriptions of each other.

FIG. 1 is a circuit block schematic diagram of a display device 100 according to an embodiment of the disclosure. The display device 100 includes a controller 110, at least one source driver (for example, source drivers 120_1, . . . , 120_*n* shown in FIG. 1), and a display panel 130. The number n of the source drivers 120_1 to 120_*n* may be determined according to the actual design. Based on actual design and application, the display panel 130 may be any display panel. For example, in an application example, the display panel 130 may be an organic light-emitting diode (OLED) display panel, a liquid-crystal display (LCD) panel, or other display panels. Each of the source drivers 120_1 to 120_*n* includes multiple source driver channels (not shown). This embodiment does not limit the specific implementation of the source driver channel. For example, the source driver channel may be a conventional source driver channel or other source driver channels. The output terminal of each source driver channel is coupled to the common terminal (input terminal) of different demultiplexers arranged on the display panel 130 (the demultiplexers are not shown in FIG. 1 and will be described in detail later). Each selection terminal (output terminal) of each demultiplexer is coupled to a different data line (or source line, not shown) of the display panel 130.

The controller 110 controls each source driver channel (not shown) of the source drivers 120_1 to 120_*n* to drive different data lines of the display panel 130 to display images. This embodiment does not limit the specific implementation of the controller 110. For example, the controller 110 may be a conventional timing controller or other controllers. According to different designs, in some embodiments, the controller 110 may be implemented as a hardware circuit. In other embodiments, the implementation of the controller 110 may be a combination of a plurality of hardware, firmware, and software (that is, program).

In terms of hardware, the controller 110 may be implemented as a logic circuit on an integrated circuit. For example, the related functions of the controller 110 may be implemented in one or more hardware controllers, microcontrollers, hardware processors, microprocessors, application-specific integrated circuits (ASICs), digital signal processors (DSP), field programmable gate arrays (FPGA), central processing units (CPU), and/or various logic blocks, modules, and circuits in other processing units. The related functions of the controller 110 may be implemented as hardware circuits using hardware description languages (such as Verilog HDL or VHDL) or other suitable programming languages, such as various logic blocks, modules, and circuits in integrated circuits.

In the form of software and/or firmware, the related functions of the controller 110 may be implemented as programming codes. For example, the controller 110 is implemented using general programming languages (such as C, C++, or assembly language) or other suitable programming languages. The programming code may be recorded/stored in a "non-transitory machine-readable storage medium". In some embodiments, the non-transitory machine-readable storage medium includes, for example, a semiconductor memory and/or a storage device. Electronic devices (such as computers, CPUs, hardware controllers, microcontrollers, hardware processors, or microprocessors) may read and execute the programming code from the non-transitory machine-readable storage medium, thereby achieving related functions of the controller 110.

Figure 2:
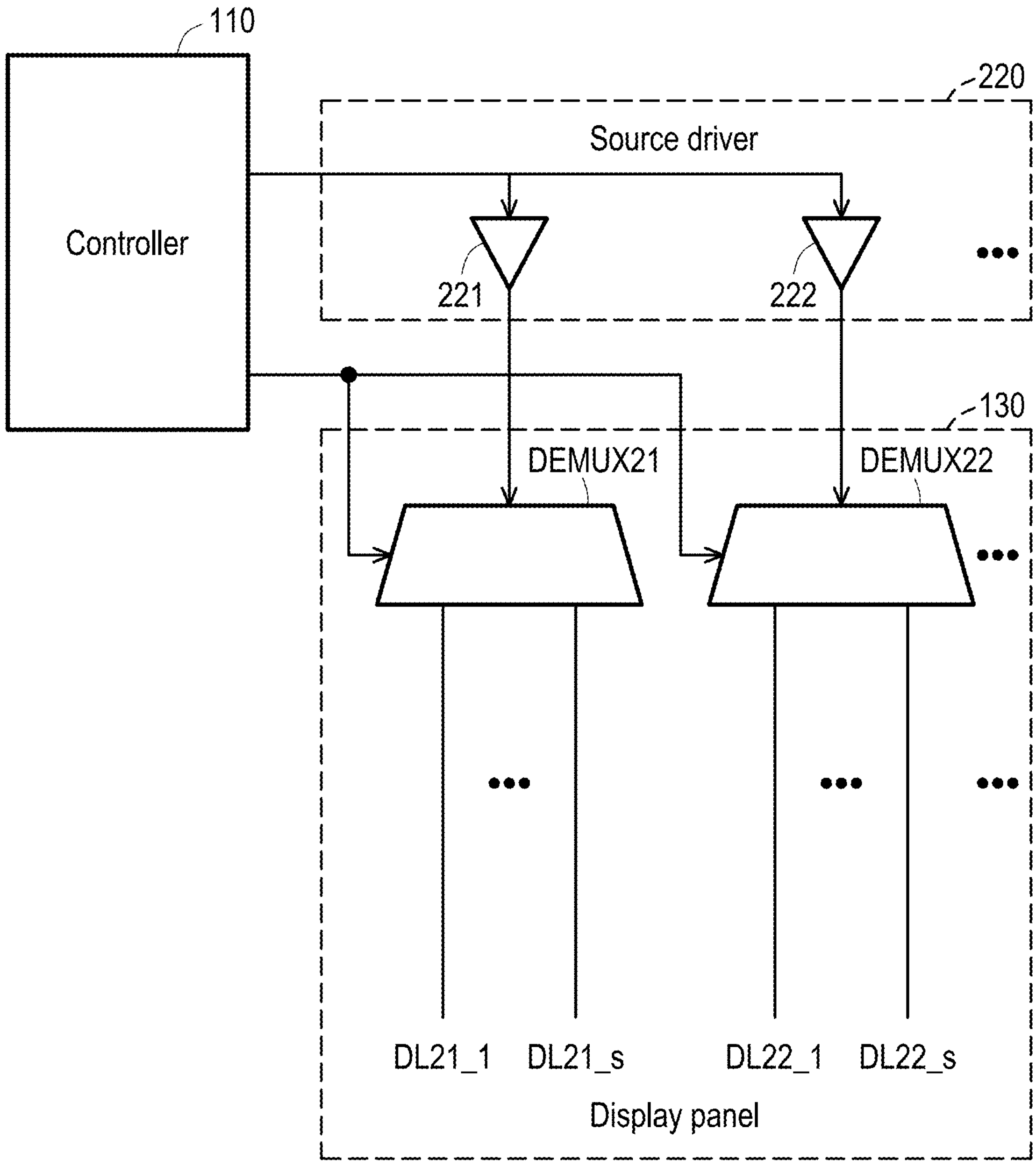
FIG. 2 is a circuit block schematic diagram of a source driver and a display panel according to an embodiment of the disclosure.

FIG. 2 is a circuit block schematic diagram of a source driver 220 and a display panel 130 according to an embodiment of the disclosure. In the embodiment shown in FIG. 2, the display device 100 includes a driver circuit and the display panel 130, and the driver circuit includes the controller 110 and the source driver 220. The source driver 220 shown in FIG. 2 may be used as one of many implementation examples of any one of the source drivers 120_1 to 120_*n* shown in FIG. 1. For the controller 110, the source driver 220, and the display panel 130 shown in FIG. 2, reference may be made to the relevant descriptions of the controller 110, the source drivers 120_1 to 120_*n*, and the display panel 130 shown in FIG. 1, and the same description applies by analogy.

In the embodiment shown in FIG. 2, the source driver 220 includes multiple source driver channels, such as source driver channels 221 and 222. The display panel 130 includes multiple data lines, such as s data lines DL21_1, . . . , DL21_*s* corresponding to the source driver channel 221, and s data lines DL22_1, . . . , DL22_*s* corresponding to the source driver channel 222. The layout positions of the data lines DL21_1 to DL21_*s* and the data lines DL22_1 to DL22_*s* in the display panel 130 shown in FIG. 2 are only for illustration, rather than actual layout positions. The number s of the data lines may be determined according to the actual design. As one of many examples, embodiments in which s is 3 and 4 will be described later. Each data line of the display panel 130 has a corresponding color attribute. For example, the color attribute of the data line DL21_1 is red in one embodiment, that is, the data line DL21_1 is connected to multiple red sub-pixels (not shown) of the display panel 130. Alternatively, the color attribute of the data line DL21_1 is green or blue in another embodiment.

The display device 100 further includes multiple demultiplexers (for example, demultiplexers DEMUX21 and DEMUX22 shown in FIG. 2). The specific number of the demultiplexers may be determined according to the actual design and application. For more other demultiplexers, reference may be made to the relevant descriptions of the demultiplexers DEMUX21 and DEMUX22, and the same description applies by analogy. Each demultiplexer includes a common terminal (input terminal) and multiple selection terminals (output terminals). The common terminal of the demultiplexer DEMUX21 is coupled to the output terminal of the source driver channel 221. Each selection terminal of the demultiplexer DEMUX21 is coupled to a corresponding one of the data lines DL21_1 to DL21_*s*. The color attributes of at least two of the data lines DL21_1 to DL21_*s* are the same color (for example, a first color). By analogy, the common terminal of the demultiplexer DEMUX22 is coupled to the output terminal of the source driver channel 222, each selection terminal of the demultiplexer DEMUX22 is coupled to a corresponding one of the data lines DL22_1 to DL22_*s*, and the color attributes of at least two of the data lines DL22_1 to DL22_*s* are the same color (for example, a second color).

The control terminals of the demultiplexers DEMUX21 and DEMUX22 are coupled to the controller 110. The controller 110 controls the demultiplexing operations of the demultiplexers DEMUX21 and DEMUX22. Based on the control of the controller 110, the demultiplexer DEMUX21 selectively couples the output terminal of the source driver channel 221 to one of the data lines DL21_1 to DL21_*s*. For the demultiplexer DEMUX22 and the data line DL22_1 to DL22_*s*, reference may be made to the relevant descriptions of the demultiplexer DEMUX21 and the data line DL21_1 to DL21_*s*, and the same description applies by analogy, so details will not be repeated here.

Figure 3:
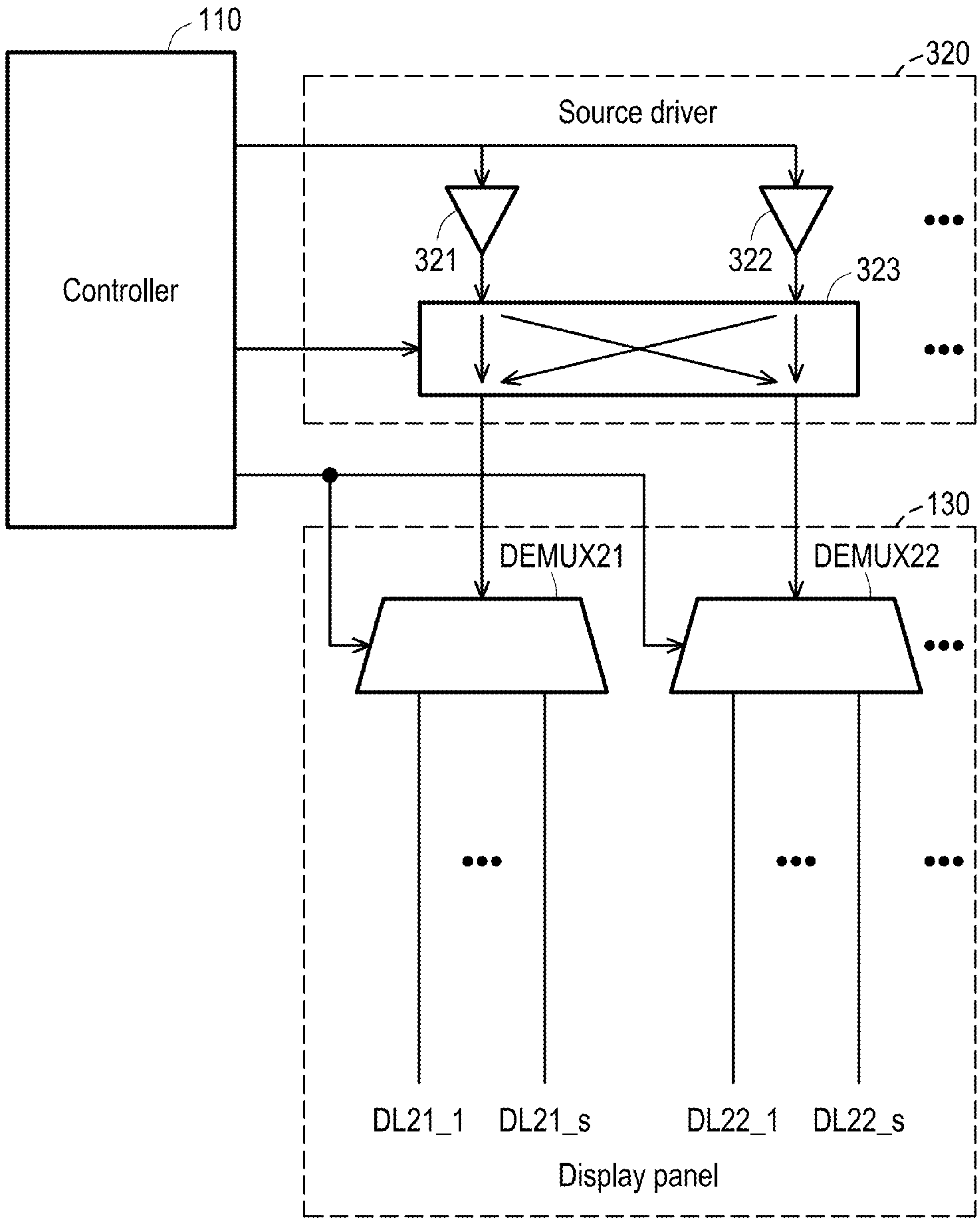
FIG. 3 is a circuit block schematic diagram of the source driver and the display panel according to another embodiment of the disclosure.

FIG. 3 is a circuit block schematic diagram of a source driver 320 and the display panel 130 according to another embodiment of the disclosure. In the embodiment shown in FIG. 3, the display device 100 includes a driver circuit and the display panel 130, and the driver circuit includes the controller 110 and the source driver 320. The source driver 320 shown in FIG. 3 may be used as one of many implementation examples of any one of the source drivers 120_1 to 120_*n* shown in FIG. 1. For the controller 110, the source driver 320, and the display panel 130 shown in FIG. 3, reference may be made to the relevant descriptions of the controller 110, the source driver 120_1 to 120_*n*, and the display panel 130 shown in FIG. 1, and the same description applies by analogy, for the display panel 130, the demultiplexer DEMUX21, the demultiplexer DEMUX22, the data line DL21_1 to DL21_*s*, and the data line DL22_1 to DL22_*s* shown in FIG. 3, reference may be made to the relevant descriptions of FIG. 3, and the same description applies by analogy, so details will not be repeated here. The layout positions of the data lines DL21_1 to DL21_*s* and the data lines DL22_1 to DL22_*s* in the display panel 130 shown in FIG. 3 are only for illustration, rather than actual layout positions.

In the embodiment shown in FIG. 3, the source driver 320 includes multiple source driver channels (for example, source driver channels 321 and 322) and multiple polarity switching circuits (for example, polarity switching circuit 323). The source driver channel 321 and the source driver channel 322 have different polarities. For example (but not limited thereto), the source driver channel 321 is used for positive polarity driving, and the source driver channel 322 is used for negative polarity driving. The first input terminal of the polarity switching circuit 323 is coupled to the output terminal of the source driver channel 321. The second input terminal of the polarity switching circuit 323 is coupled to the output terminal of the source driver channel 322. The first output terminal of the polarity switching circuit 323 is coupled to the common terminal of the demultiplexer DEMUX21. The second output terminal of the polarity switching circuit 323 is coupled to the common terminal of the demultiplexer DEMUX22. The control terminal of the polarity switching circuit 323 is coupled to the controller 110.

The controller 110 controls the routing switching operation of the polarity switching circuit 323. In response to the display panel 130 operating in a first polarity configuration, the common terminal of the demultiplexer DEMUX21 is coupled to the output terminal of the source driver channel 321 through the polarity switching circuit 323, and the common terminal of the demultiplexer DEMUX22 is coupled to the output terminal of the source driver channel 322 through the polarity switching circuit 323. In response to the display panel 130 operating in a second polarity configuration, the common terminal of the demultiplexer DEMUX21 is coupled to the output terminal of the second source driver channel 322 through the polarity switching circuit 323, and the common terminal of the demultiplexer DEMUX22 is coupled to the output terminal of the source driver channel 321 through the polarity switching circuit 323.

Figure 4:
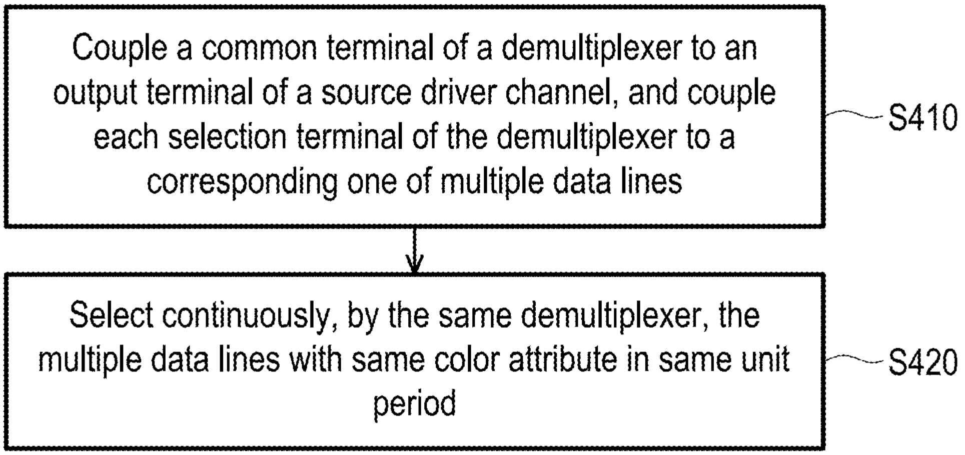
FIG. 4 is a schematic flow chart of a driving method of a display panel according to an embodiment of the disclosure.

FIG. 4 is a schematic flow chart of a driving method of a display panel according to an embodiment of the disclosure. In some application examples, the process shown in FIG. 4 may be applicable to the embodiment shown in FIG. 2. In some other application examples, the process shown in FIG. 4 may be applicable to the embodiment shown in FIG. 3. In Step S410, the common terminal of the demultiplexer DEMUX21 is coupled to the output terminal of the source driver channel 221 (see FIG. 2), or the common terminal of the demultiplexer DEMUX21 is coupled to the output terminal of the source driver channel 321 or 322 through the polarity switching circuit 323 (see FIG. 3). In addition, each selection terminal of the demultiplexer DEMUX21 is coupled to a corresponding one of the data lines DL21_1 to DL21_*s*.

For convenience of explanation, a unit period is defined here as: the same demultiplexer selects each selection terminal (data line) only once in the same unit period. For example, the demultiplexer DEMUX21 selects each data line DL21_1 to DL21_*s* only once in the same unit period. In Step S420, the demultiplexer DEMUX21 continuously selects the data lines with the same color attribute as the first color in a unit period. As one of many examples, the following will explain the embodiment of "a demultiplexer with 3 selection terminals" (that is, s is 3).

Figure 5:
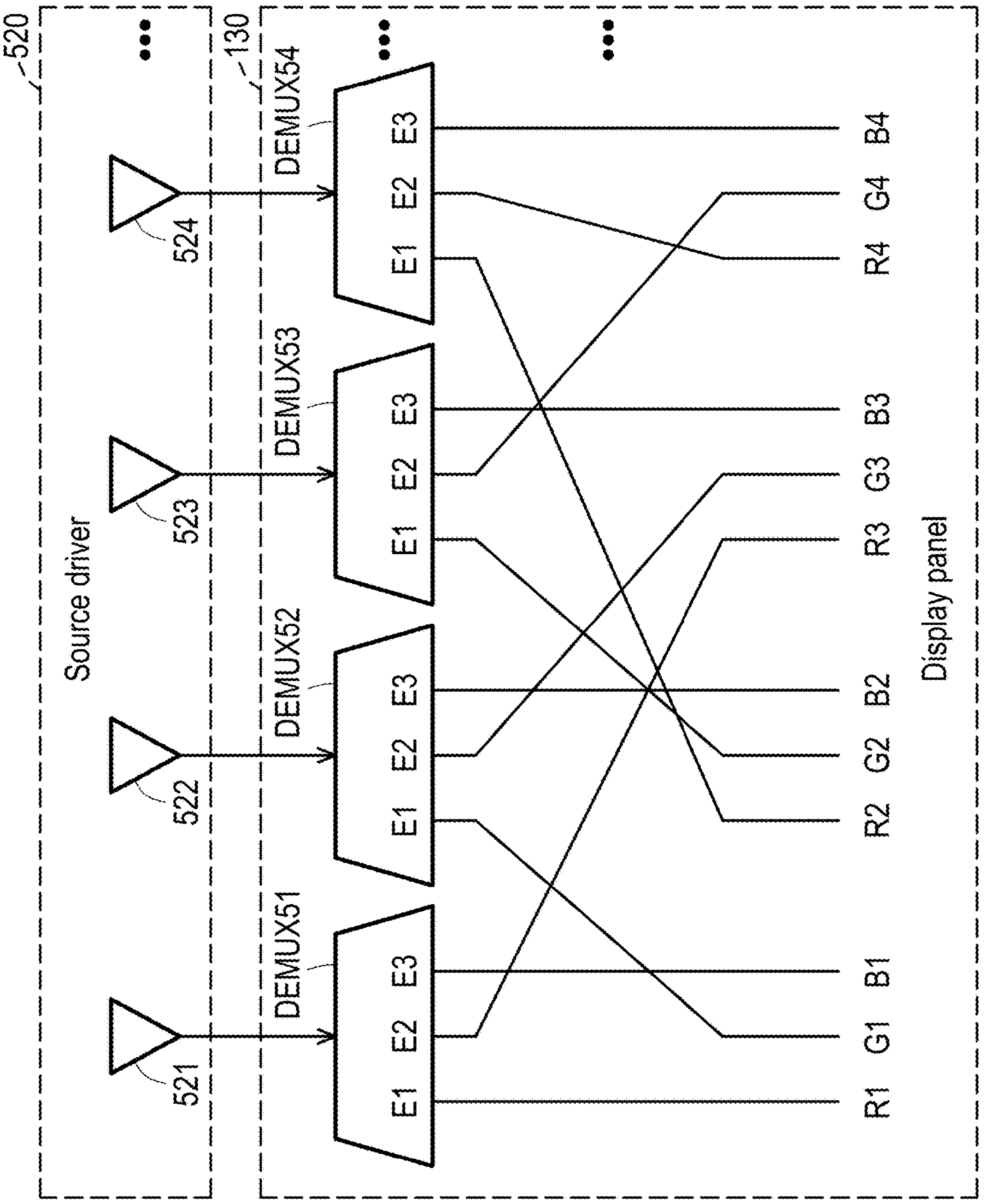
FIG. 5 is a circuit block schematic diagram of the display panel according to yet another embodiment of the disclosure.

FIG. 5 is a circuit block schematic diagram of the display panel 130 according to yet another embodiment of the disclosure. In the embodiment shown in FIG. 5, the display device 100 includes the controller 110, a source driver 520, and the display panel 130, and the display panel 130 includes data lines R1, G1, B1, R2, G2, B2, R3, G3, B3, R4, G4, B4, . . . . The data lines R1, G1, B1, R2, G2, B2, R3, G3, B3, R4, G4, and B4 form a data line group of adjacent data lines. The color attributes of the data lines R1, R2, R3, and R4 are all red. The color attributes of the data lines G1, G2, G3, and G4 are all green. The color attributes of the data lines B1, B2, B3, and B4 are all blue. For the source driver 520, the display panel 130, and the data lines R1 to R4, G1 to G4, and B1 to B4 shown in FIG. 5, reference may be made to the relevant descriptions of the source driver 220, the display panel 130, and the data lines DL21_1 to DL21_*s*, DL22_1 to DL22_*s* shown in FIG. 2, or reference may be made to the relevant descriptions of the source driver 320, the display panel 130, and the data lines DL21_1 to DL21_*s*, DL22_1 to DL22_*s* shown in FIG. 3, and the same description applies by analogy, so details will not be repeated here.

The display device 100 further includes multiple demultiplexers (for example, demultiplexers DEMUX51, DEMUX52, DEMUX53, and DEMUX54 shown in FIG. 5), and the source driver 520 includes multiple source driver channels (for example, source driver channels 521, 522, 523, and 524 shown in FIG. 5). For the demultiplexer DEMUX51 to DEMUX54 and the source driver channels 521 to 524 shown in FIG. 5, reference may be made to the relevant descriptions of the demultiplexer DEMUX21 to DEMUX22 and the source driver channels 221 to 222 shown in FIG. 2, or reference may be made to the relevant descriptions of the demultiplexers DEMUX21 to DEMUX22 and the source driver channels 321 to 322 shown in FIG. 3, and the same description applies by analogy, so details will not be repeated here.

In the embodiment shown in FIG. 5, the common terminals of the demultiplexer DEMUX51 to DEMUX54 are directly or indirectly coupled to the output terminals of the source driver channels 521 to 524 respectively. The color attributes of at least two data lines connected to the same demultiplexer are the same color. For example, the selection terminals E1, E2, and E3 of the demultiplexer DEMUX51 are respectively coupled to the data lines R1, R3, and B1 (the first line, seventh line, and third line in the data line group, in which the color attributes of the data lines R1 and R3 are both red). The selection terminals E1, E2, and E3 of the demultiplexer DEMUX52 are respectively coupled to the data lines G1, G3, and B2 (the second line, eighth line, and sixth line in the data line group, in which the color attributes of the data lines G1 and G3 are both green). The selection terminals E1, E2, and E3 of the demultiplexer DEMUX53 are respectively coupled to the data lines G2, G4, and B3 (the fifth line, eleventh line, and ninth line in the data line group, in which the color attributes of the data lines G2 and G4 are both green). The selection terminals E1, E2, and E3 of the demultiplexer DEMUX54 are respectively coupled to the data lines R2, R4, and B4 (the fourth line, tenth line, and twelfth line in the data line group, in which the color attributes of the data lines R2 and R4 are both red).

Figure 6:
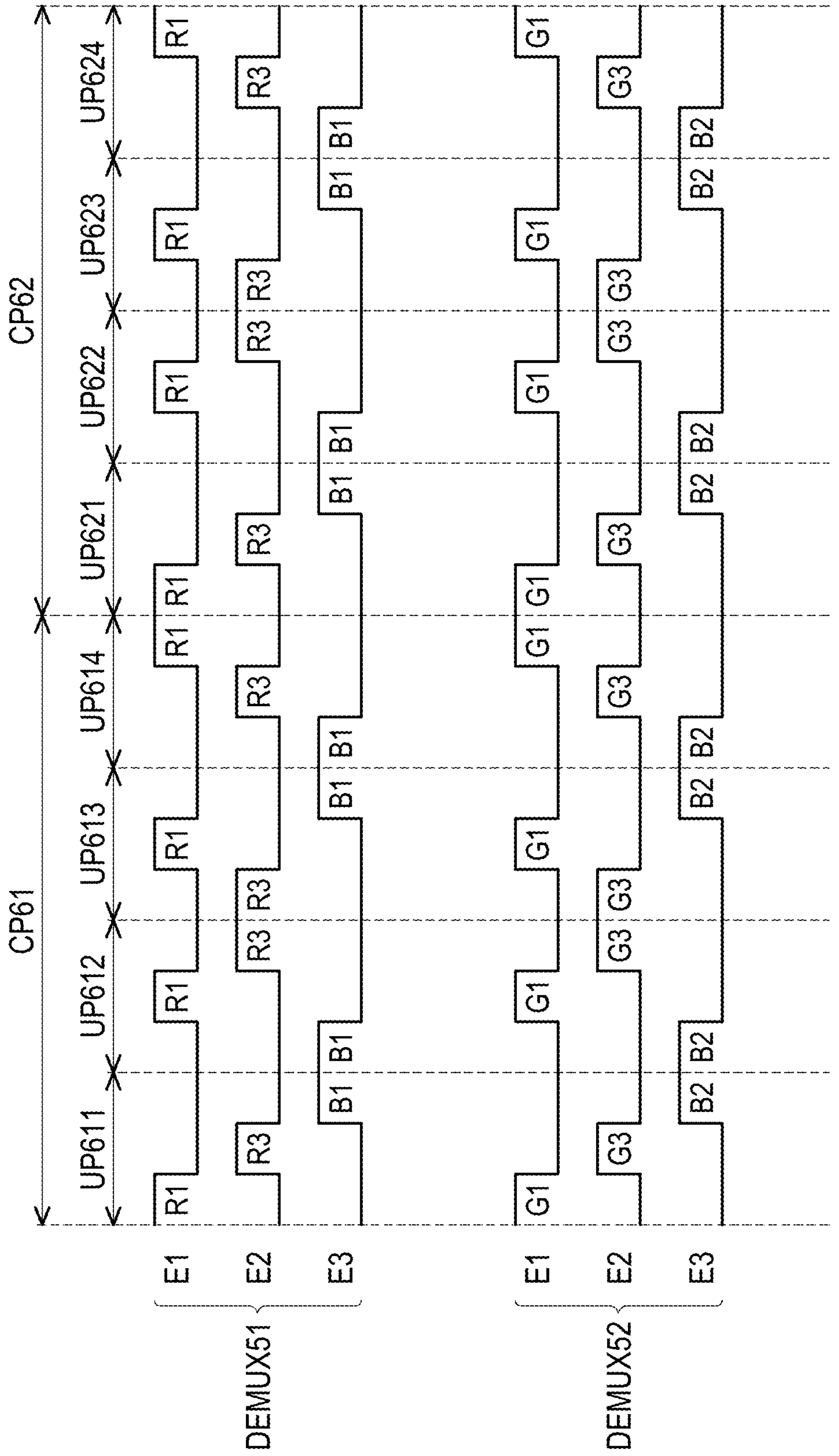
FIG. 6 is a schematic diagram of a demultiplexing sequence of the demultiplexer according to an embodiment of the disclosure.

FIG. 6 is a schematic diagram of a demultiplexing sequence of the demultiplexers DEMUX51 and DEMUX52 according to an embodiment of the disclosure. The horizontal axis of FIG. 6 represents time. The upper part of FIG. 6 shows the demultiplexing sequence of the demultiplexer DEMUX51, while the lower part of FIG. 6 shows the demultiplexing sequence of the demultiplexer DEMUX52. In the embodiment shown in FIG. 6, both demultiplexers DEMUX51 and DEMUX52 have the same demultiplexing sequence. FIG. 6 shows unit periods UP611, UP612, UP613, UP614, UP621, UP622, UP623, and UP624. It should be noted that the starting data line selected in one unit period can be varied according to actual applications. A unit period is equivalent to a horizontal line period (or scan line period). Multiple consecutive unit periods are defined as a cycle period, and different unit periods in the same cycle period have different demultiplexing sequence. For example, the demultiplexing sequence of the demultiplexer DEMUX51 in the unit period UP611 is the selection terminal E1, the selection terminal E2, the selection terminal E3, the demultiplexing sequence of the demultiplexer DEMUX51 in the unit period UP612 is the selection terminal E3, the selection terminal E1, the selection terminal E2, the demultiplexing sequence of the demultiplexer DEMUX51 in the unit period UP613 is the selection terminal E2, the selection terminal E1, the selection terminal E3, and the demultiplexing sequence of the demultiplexer DEMUX51 in the unit period UP614 is the selection terminal E3, the selection terminal E2, the selection terminal E1.

The same demultiplexer has the same demultiplexing sequence in different cycle periods in the same frame period. For example, in the embodiment shown in FIG. 6, four consecutive unit periods UP611 to UP614 are defined as a cycle period CP61, and four consecutive unit periods UP621 to UP624 are defined as a cycle period CP62. The following description will take the cycle period CP61 as an example. For the cycle period CP62, reference may be made to the relevant descriptions of the cycle period CP61, and the same description applies by analogy.

Please refer to FIG. 5 and FIG. 6. The demultiplexers DEMUX51 to DEMUX54 continuously select at least two different data lines with the same color attribute in each unit period. For example, in the unit period UP611, the demultiplexer DEMUX51 continuously selects the data lines R1 and R3 both with the color attributes as red, while the demultiplexer DEMUX52 continuously selects the data lines G1 and G3 both with the color attributes as green.

In the embodiment of FIG. 6, among the data lines coupled to the demultiplexer DEMUX51, only the data line B1 has a color attribute as blue, and among the data lines coupled to the demultiplexer DEMUX52, only the data line B2 has a color attribute as blue. A right boundary (first boundary) of the unit period UP611 is temporally adjacent to a left boundary (second boundary) of the unit period UP612. The demultiplexer DEMUX51 continuously selects the data line B1 with the color attribute as blue at the right boundary of the unit period UP611 and the left boundary of the unit period UP612, and the demultiplexer DEMUX52 continuously selects the data line B2 with the color attribute as blue at the right boundary of the unit period UP611 and the left boundary of the unit period UP612.

Please note that the above is just an example. The starting unit period selected in one cycle period can be varied according to actual applications. For example, in another embodiment, the cycle period CP61 may include unit periods UP612, UP613, UP614, and UP621 (the unit period UP611 belongs to a previous cycle period not shown), and the cycle period CP62 may include unit periods UP622, UP623, and UP624.

Based on the above, the common terminal of the demultiplexer DEMUX51 is coupled to the output terminal of the source driver channel 521, and the selection terminals E1, E2, and E3 of the demultiplexer DEMUX51 are coupled to the data lines R1, R3, and B1 respectively. Based on the switching operation of the demultiplexer DEMUX51, the multiple data lines R1, R3, and B1 of the display panel 130 can share the same source driver channel 521 of the source driver 520. Therefore, the total number of the source driver channels of the source driver 520 can be effectively reduced. In addition, the demultiplexer DEMUX51 continuously selects the multiple data lines R1 and R3 with the same color attribute (red) in the same unit period UP611, so the red sub-pixel of the data line R3 is more fully charged. The demultiplexer DEMUX51 continuously selects the data line B1 with the color attribute as blue at the boundary between the unit period UP611 and the unit period UP612, so the blue sub-pixel of the data line B1 is more fully charged in the unit period UP612. By the same token, based on the demultiplexing sequence of the demultiplexer DEMUX52, the green sub-pixel of the data line G3 is more fully charged, and the blue sub-pixel of the data line B2 is more fully charged in the unit period UP612. Therefore, the display device 100 can improve the uniformity of a single color image. Another advantage is that this arrangement can have the demultiplexer stay at the same data line as switching between two adjacent unit periods which improves color uniformity.

In some application examples, the same demultiplexer may have the same demultiplexing sequence in different frame periods. In some other application examples, the same demultiplexer may have different demultiplexing sequences in different frame periods. For example, the demultiplexing sequences of the demultiplexer DEMUX51 in the unit periods UP611, UP612, UP613, and UP614 in the first frame period may be a first demultiplexing sequence, a second demultiplexing sequence, a third demultiplexing sequence, and a fourth demultiplexing sequence respectively. In a second frame period after the first frame period, the demultiplexing sequences of the demultiplexer DEMUX51 in the unit periods UP611, UP612, UP613, and UP614 may be the second demultiplexing sequence, the third demultiplexing sequence, the fourth demultiplexing sequence, and the first demultiplexing sequence respectively. In a third frame period after the second frame period, the demultiplexing sequences of the demultiplexer DEMUX51 in the unit periods UP611, UP612, UP613, and UP614 may be the third demultiplexing sequence, the fourth demultiplexing sequence, the first demultiplexing sequence, and the second demultiplexing sequence respectively. In a fourth frame period after the third frame period, the demultiplexing sequences of the demultiplexer DEMUX51 in the unit periods UP611, UP612, UP613, and UP614 may be the fourth demultiplexing sequence, the first demultiplexing sequence, the second demultiplexing sequence, and the third demultiplexing sequence respectively.

The "first demultiplexing sequence", "second demultiplexing sequence", "third demultiplexing sequence", and "fourth demultiplexing sequence" may be different demultiplexing sequences based on actual design. For example (but not limited thereto), the first demultiplexing sequence is "the selection terminal E1, the selection terminal E2, the selection terminal E3", the second demultiplexing sequence is "the selection terminal E3, the selection terminal E1, the selection terminal E2", the third demultiplexing sequence is "the selection terminal E2, the selection terminal E1, the selection terminal E3", and the fourth demultiplexing sequence is "the selection terminal E3, the selection terminal E2, the selection terminal E1".

Figure 7:
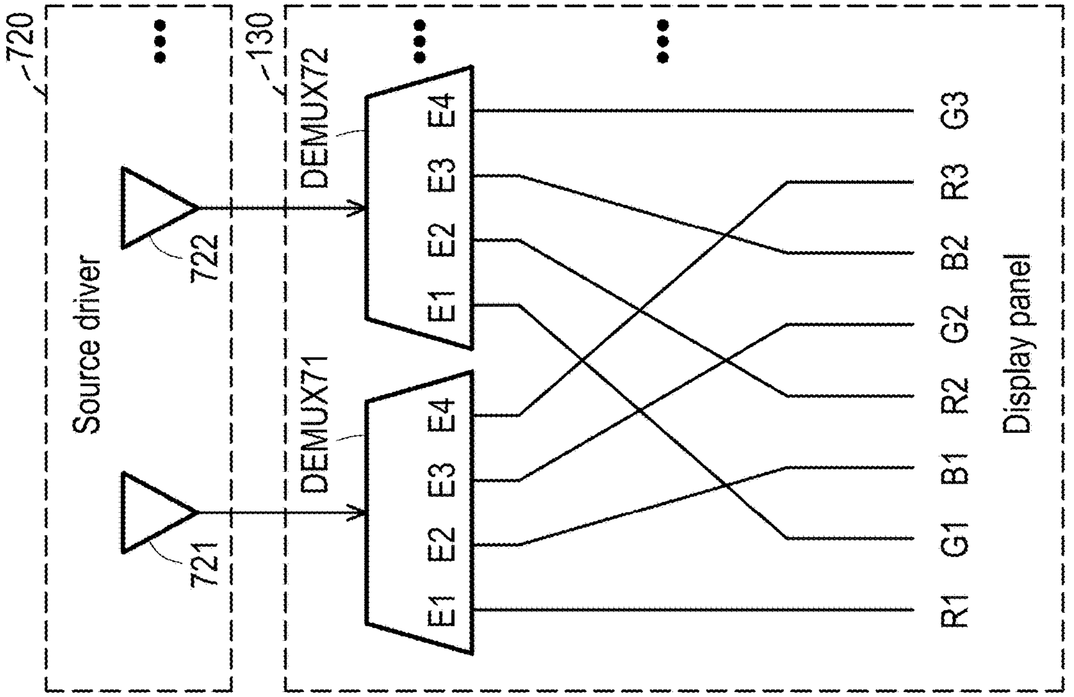
FIG. 7 is a circuit block schematic diagram of the display panel according to still another embodiment of the disclosure.

FIG. 7 is a circuit block schematic diagram of the display panel 130 according to still another embodiment of the disclosure. In the embodiment shown in FIG. 7, the display device 100 includes the controller 110, a source driver 720, and the display panel 130, and the display panel 130 includes data lines R1, G1, B1, R2, G2, B2, R3, G3, . . . . The data lines R1, G1, B1, R2, G2, B2, R3, and G3 form a data line group of adjacent data lines. The color attributes of the data lines R1, R2, and R3 are all red. The color attributes of the data lines G1, G2, and G3 are all green. The color attributes of the data lines B1 and B2 are both blue. For the source driver 720, the display panel 130, and the data lines R1 to R3, G1 to G3, and B1 to B2 shown in FIG. 7, reference may be made to the relevant descriptions of the source driver 220, the display panel 130, and the data lines DL21_1 to DL21_*s*, DL22_1 to DL22_*s* shown in FIG. 2, or reference may be made to the relevant descriptions of the source driver 320, the display panel 130, and the data lines DL21_1 to DL21_*s*, DL22_1 to DL22_*s* shown in FIG. 3, and the same description applies by analogy, so details will not be repeated here.

The display device 100 further includes multiple demultiplexers (such as demultiplexers DEMUX71 and DEMUX72 shown in FIG. 7), and the source driver 720 includes multiple source driver channels (such as source driver channels 721 and 722 shown in FIG. 7). For the demultiplexer DEMUX71 to DEMUX72 and the source driver channels 721 to 722 shown in FIG. 7, reference may be made to the relevant descriptions of the demultiplexer DEMUX21 to DEMUX22 and the source driver channel 221 to 222 shown in FIG. 2, or reference may be made to the relevant descriptions of the demultiplexer DEMUX21 to DEMUX22 and the source driver channels 321 to 322 shown in FIG. 3, and the same description applies by analogy, so details will not be repeated here.

In the embodiment shown in FIG. 7, the common terminals of the demultiplexer DEMUX71 to DEMUX72 are directly or indirectly coupled to the output terminals of the source driver channels 721 to 722 respectively. The color attributes of at least two data lines connected to the same demultiplexer are the same color. For example, the selection terminals E1, E2, E3, and E4 of the demultiplexer DEMUX71 are respectively coupled to the data lines R1, B1, G2, and R3 (the first line, third line, fifth line, and seventh line in the data line group, in which the color attributes of the data lines R1 and R3 are both red). The selection terminals E1, E2, E3, and E4 of the demultiplexer DEMUX72 are respectively coupled to the data lines G1, R2, B2, and G3 (the second line, fourth line, sixth line, and eighth line in the data line group, in which the color attributes of the data lines G1 and G3 are both green).

Figure 8:
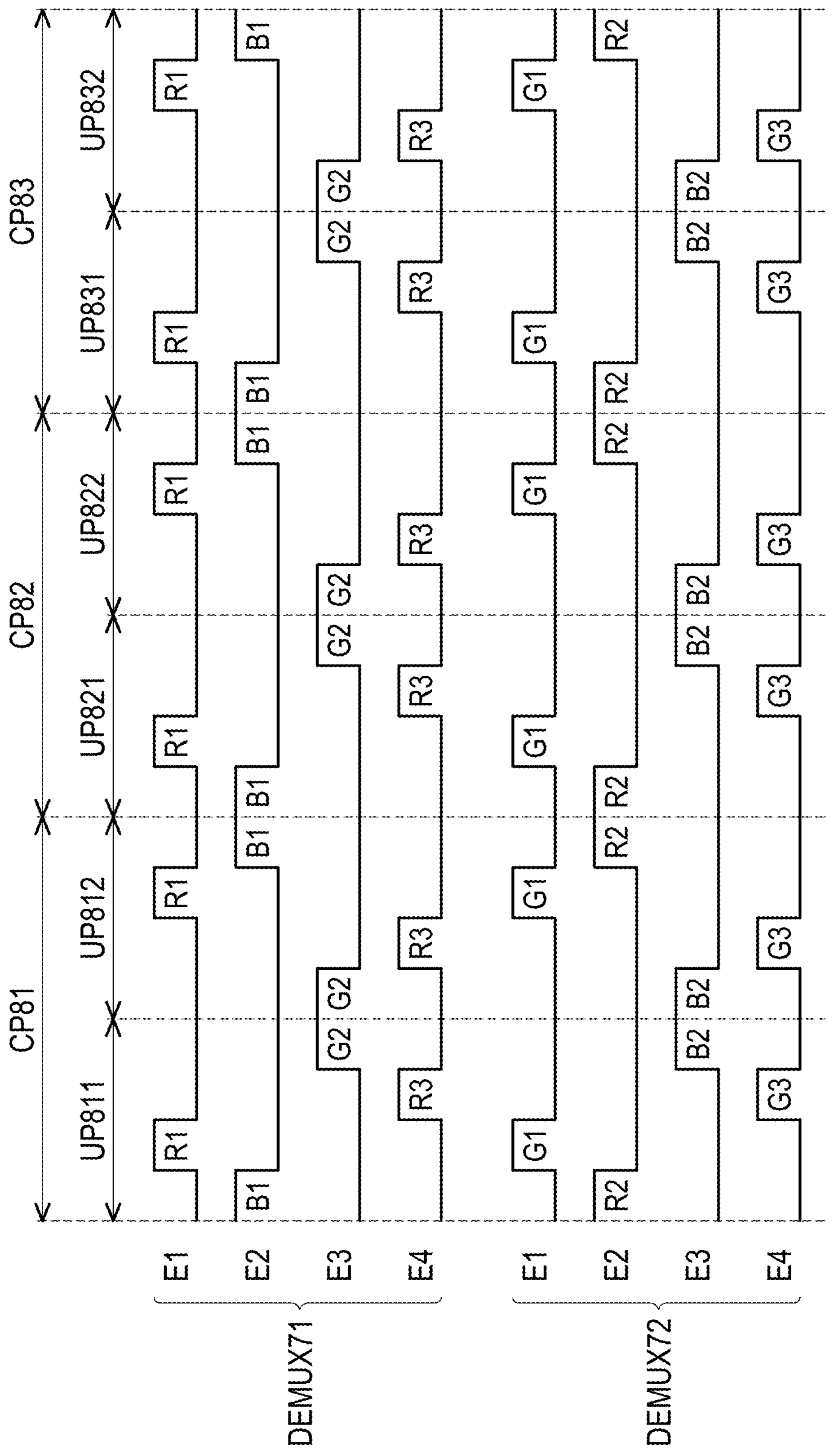
FIG. 8 is a schematic diagram of the demultiplexing sequence of the demultiplexer according to an embodiment of the disclosure.

FIG. 8 is a schematic diagram of the demultiplexing sequence of the demultiplexers DEMUX71 and DEMUX72 according to an embodiment of the disclosure. The horizontal axis of FIG. 8 represents time. The upper part of FIG. 8 shows the demultiplexing sequence of the demultiplexer DEMUX71, while the lower part of FIG. 8 shows the demultiplexing sequence of the demultiplexer DEMUX72. In the embodiment shown in FIG. 8, both demultiplexers DEMUX71 and DEMUX72 have the same demultiplexing sequence. FIG. 8 shows unit periods UP811, UP812, UP821, UP822, UP831, and UP832. The demultiplexing sequence of the demultiplexer DEMUX71 in the unit period UP811 is the selection terminal E2, the selection terminal E1, the selection terminal E4, the selection terminal E3, and the demultiplexing sequence of the demultiplexer DEMUX71 in the unit period UP812 is the selection terminal E3, the selection terminal E4, the selection terminal E1, the selection terminal E2.

The same demultiplexer has the same demultiplexing sequence in different cycle periods in the same frame period. For example, in the embodiment shown in FIG. 8, two consecutive unit periods UP811 to UP812 are defined as a cycle period CP81, two consecutive unit periods UP821 to UP822 are defined as a cycle period CP82, and two consecutive unit periods UP831 to UP832 are defined as cycle period CP83. The following description will take the cycle period CP81 as an example. For other cycle periods CP82 and CP83, reference may be made to the relevant descriptions of the cycle period CP81, and the same description applies by analogy.

Please refer to FIG. 7 and FIG. 8. The demultiplexers DEMUX71 to DEMUX72 continuously select at least two different data lines with the same color attribute in each unit period. For example, in the unit period UP811, the demultiplexer DEMUX71 continuously selects the data lines R1 and R3 both with the color attributes as red, while the demultiplexer DEMUX72 continuously selects the data lines G1 and G3 both with the color attributes as green.

In the embodiment of FIG. 8, among the data lines coupled to the demultiplexer DEMUX71, only the data line G2 has a color attribute as green, and among the data lines coupled to the demultiplexer DEMUX72, only the data line B2 has a color attribute as blue. The right boundary (first boundary) of the unit period UP811 is temporally adjacent to the left boundary (second boundary) of the unit period UP812. The demultiplexer DEMUX71 continuously selects the data line G2 with the color attribute as green at the right boundary of the unit period UP811 and the left boundary of the unit period UP812, and the demultiplexer DEMUX72 continuously selects the data line B2 with the color attribute as blue at the right boundary of the unit period UP811 and the left boundary of the unit period UP812. Among the data lines coupled to the demultiplexer DEMUX71, only the data line B1 has a color attribute as blue, and among the data line coupled to the demultiplexer DEMUX72, only the data line R2 has a color attribute as red. The right boundary (third boundary) of the unit period UP812 is temporally adjacent to the left boundary (fourth boundary) of the unit period UP821. The demultiplexer DEMUX71 continuously selects the data line B1 with the color attribute as blue at the right boundary of the unit period UP812 and the left boundary of the unit period UP821, and the demultiplexer DEMUX72 continuously selects the data line R2 with the color attribute as red at the right boundary of the unit period UP812 and the left boundary of the unit period UP821.

Please note that the above is just an example. The starting unit period selected in one cycle period can be varied according to actual applications. For example, in another embodiment, the cycle period CP81 may include unit periods UP812 and UP821 (the unit period UP811 belongs to a previous cycle period not shown), the cycle period CP82 may include unit periods UP822 and UP831, and the cycle period CP83 may include unit period UP832.

Based on the above, the common terminal of the demultiplexer DEMUX71 is coupled to the output terminal of the source driver channel 721, and the selection terminals E1, E2, E3, and E4 of the demultiplexer DEMUX71 are coupled to the data lines R1, B1, G2, and R3 respectively. Based on the switching operation of the demultiplexer DEMUX71, the multiple data lines R1, B1, G2, and R3 of the display panel 130 can share the same source driver channel 721 of the source driver 720. Therefore, the total number of the source driver channels of the source driver 720 can be effectively reduced. In addition, the demultiplexer DEMUX71 continuously selects the data lines R1 and R3 with the same color attribute (red) in the same unit period UP811, so the red sub-pixel of the data line R3 is more fully charged. The demultiplexer DEMUX71 continuously selects the data line G2 with the color attribute as green at the boundary between the unit period UP811 and the unit period UP812, so the green sub-pixel of the data line G2 is more fully charged in the unit period UP812. The demultiplexer DEMUX71 continuously selects the data line B1 with the color attribute as blue at the boundary between the unit period UP812 and the unit period UP821, so the blue sub-pixel of the data line B1 is more fully charged in the unit period UP821. By the same token, based on the demultiplexing sequence of the demultiplexer DEMUX72, the green sub-pixel of the data line G3 is more fully charged in the unit period UP811, the blue sub-pixel of the data line B2 is more fully charged in the unit period UP812, and the red sub-pixel of the data line R2 is more fully charged in the unit period UP821. Therefore, the display device 100 can improve the uniformity of a single color image. Another advantage is that this arrangement can have the demultiplexer stay at the same data line as switching between two adjacent unit periods which improves color uniformity.

In some application examples, the same demultiplexer has the same demultiplexing sequence in different frame periods. In some other application examples, the same demultiplexer may have different demultiplexing sequences in different frame periods. For example, the demultiplexing sequence of the demultiplexer DEMUX71 in the cycle period CP81 of the first frame period may be "the selection terminal E2, the selection terminal E1, the selection terminal E4, the selection terminal E3, the selection terminal E3, the selection terminal E4, the selection terminal E1, the selection terminal E2". In the second frame period after the first frame period, the demultiplexing sequence of the demultiplexer DEMUX71 in the cycle period CP81 may be "the selection terminal E3, the selection terminal E4, the selection terminal E1, the selection terminal E2, the selection terminal E2, the selection terminal E1, the selection terminal E4, the selection terminal E3".

Figure 9:
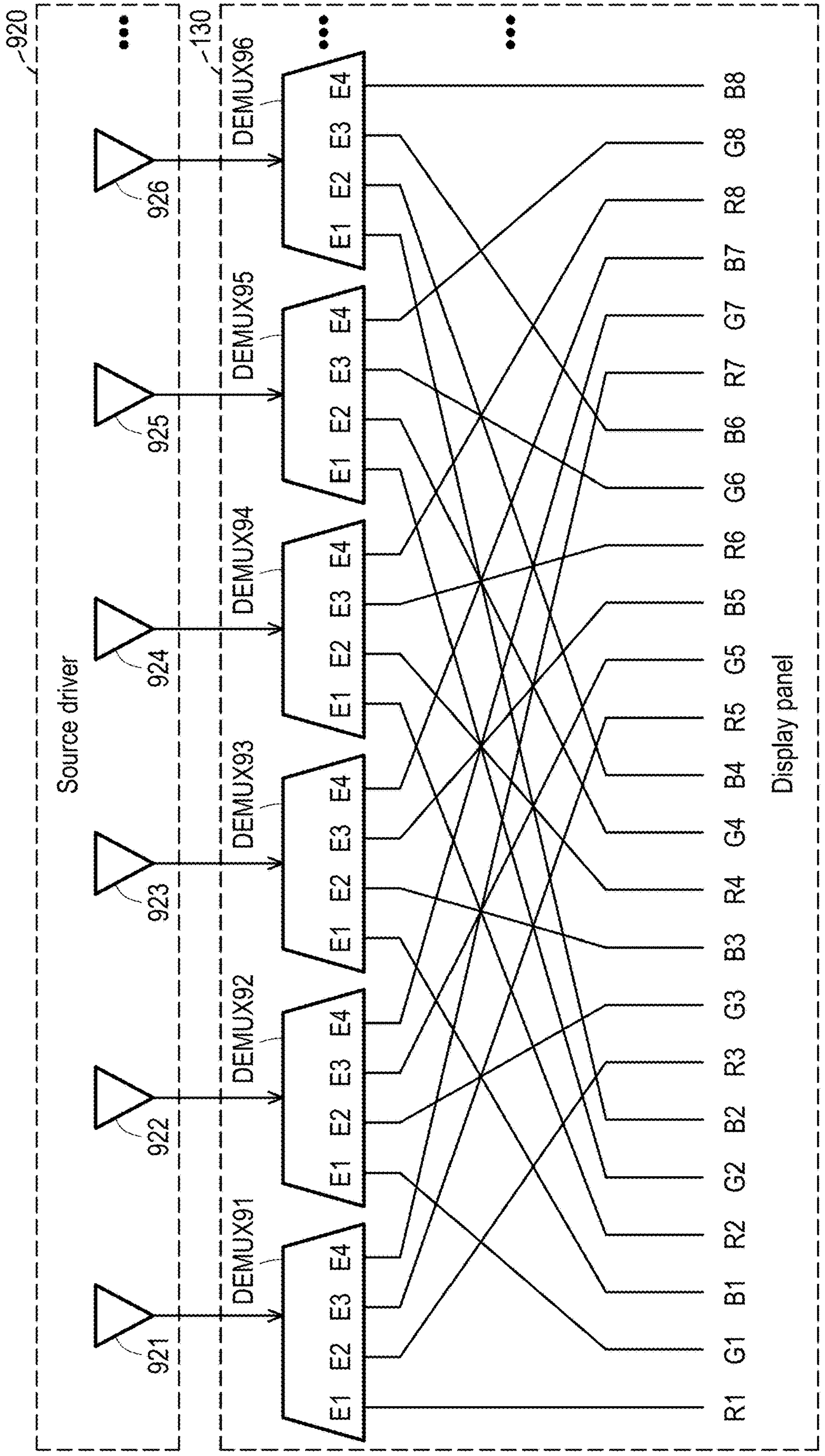
FIG. 9 is a circuit block schematic diagram of the display panel according to another additional embodiment of the disclosure.

FIG. 9 is a circuit block schematic diagram of the display panel 130 according to another additional embodiment of the disclosure. In the embodiment shown in FIG. 9, the display device 100 includes the controller 110, a source driver 920, and the display panel 130, and the display panel 130 includes data lines R1, G1, B1, R2, G2, B2, R3, G3, B3, R4, G4, B4, R5, G5, B5, R6, G6, B6, R7, G7, B7, R8, G8, B8, . . . . The data lines R1 to R8, G1 to G8, and B1 to B8 form a data line group of adjacent data lines. The color attributes of the data lines R1 to R8 are all red. The color attributes of the data lines G1 to G8 are all green. The color attributes of the data lines B1 to B8 are all blue. For the source driver 920, the display panel 130, and the data lines R1 to R8, G1 to G8, and B1 to B8 shown in FIG. 9, reference may be made to the relevant descriptions of the source driver 220, the display panel 130, and the data lines DL21_1 to DL21_*s*, DL22_1 to DL22_*s* shown in FIG. 2, or reference may be made to the relevant descriptions of the source driver 320, the display panel 130, and the data lines DL21_1 to DL21_*s*, DL22_1 to DL22_*s* shown in FIG. 3, and the same description applies by analogy, so details will not be repeated here.

The display device 100 further includes multiple demultiplexers (for example, demultiplexers DEMUX91, DEMUX92, DEMUX93, DEMUX94, DEMUX95, and DEMUX96 shown in FIG. 9), and the source driver 920 includes multiple source driver channels (for example, source driver channels 921, 922, 923, 924, 925, and 926 shown in FIG. 9). For the demultiplexer DEMUX91 to DEMUX96 and the source driver channels 921 to 926 shown in FIG. 9, reference may be made to the relevant descriptions of the demultiplexer DEMUX21 to DEMUX22 and the source driver channel 221 to 222 shown in FIG. 2, or reference may be made to the relevant descriptions of the demultiplexer DEMUX21 to DEMUX22 and the source driver channels 321 to 322 shown in FIG. 3, and the same description applies by analogy, so details will not be repeated here.

In the embodiment shown in FIG. 9, the common terminals of the demultiplexers DEMUX91 to DEMUX96 are directly or indirectly coupled to the output terminals of the source driver channels 921 to 926 respectively. The color attributes of at least two data lines connected to the same demultiplexer are the same color. In the embodiment shown in FIG. 9, the color attributes of multiple data lines coupled to the same demultiplexer are all of the same color. For example, the selection terminals E1, E2, E3, and E4 of the demultiplexer DEMUX91 are respectively coupled to the data lines R1, R3, R5, and R7 (the color attributes are all red). The selection terminals E1, E2, E3, and E4 of the demultiplexer DEMUX92 are respectively coupled to the data lines G1, G3, G5, and G7 (the color attributes are all green). The selection terminals E1, E2, E3, and E4 of the demultiplexer DEMUX93 are respectively coupled to the data lines B1, B3, B5, and B7 (the color attributes are all blue). The selection terminals E1, E2, E3, and E4 of the demultiplexer DEMUX94 are respectively coupled to the data lines R2, R4, R6, and R8 (the color attributes are all red). The selection terminals E1, E2, E3, and E4 of the demultiplexer DEMUX95 are respectively coupled to the data lines G2, G4, G6, and G8 (the color attributes are all green). The selection terminals E1, E2, E3, and E4 of the demultiplexer DEMUX96 are respectively coupled to the data lines B2, B4, B6, and B8 (the color attributes are all blue).

Figure 10:
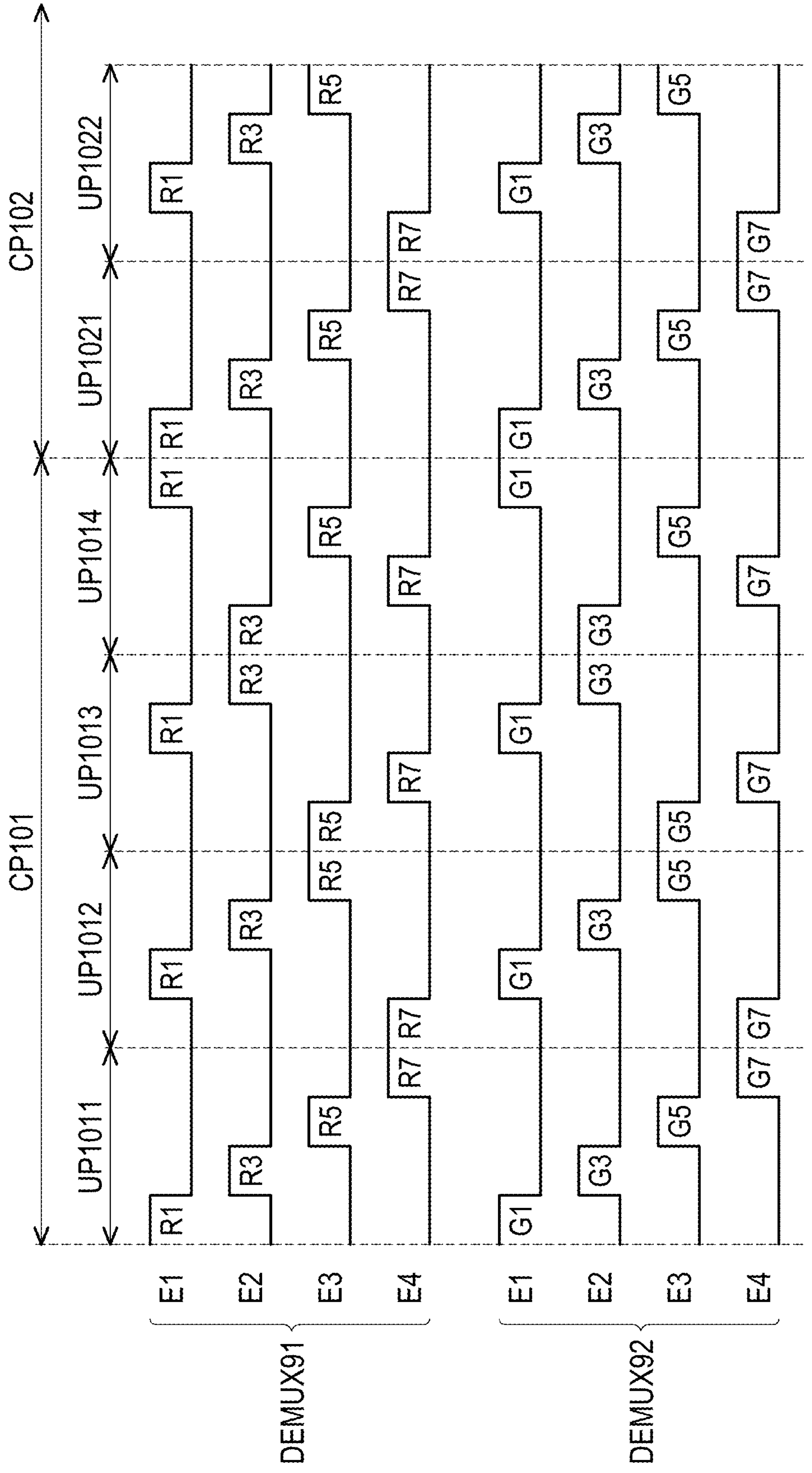
FIG. 10 is a schematic diagram of the demultiplexing sequence of the demultiplexer according to an embodiment of the disclosure.

FIG. 10 is a schematic diagram of the demultiplexing sequence of the demultiplexers DEMUX91 and DEMUX92 according to an embodiment of the disclosure. The horizontal axis of FIG. 10 represents time. The upper part of FIG. 10 shows the demultiplexing sequence of the demultiplexer DEMUX91, while the lower part of FIG. 10 shows the demultiplexing sequence of the demultiplexer DEMUX92. In the embodiment shown in FIG. 10, both demultiplexers DEMUX91 and DEMUX92 have the same demultiplexing sequence. FIG. 10 shows unit periods UP1011, UP1012, UP1013, UP1014, UP1021, and UP1022. The same demultiplexer has the same demultiplexing sequence in different cycle periods in the same frame period. For example, in the embodiment shown in FIG. 10, four consecutive unit periods UP1011 to UP1014 are defined as a cycle period CP101, while unit periods UP1021 and UP1022 belong to another cycle period CP102. The demultiplexing sequence of the demultiplexer DEMUX91 in the unit period UP1011 is "the selection terminal E1, the selection terminal E2, the selection terminal E3, the selection terminal E4", the demultiplexing sequence of the demultiplexer DEMUX91 in the unit period UP1012 is "the selection terminal E4, the selection terminal E1, the selection terminal E2, the selection terminal E3", the demultiplexing sequence of the demultiplexer DEMUX91 in the unit period UP1013 is "the selection terminal E3, the selection terminal E4, the selection terminal E1, the selection terminal E2", and the demultiplexing sequence of the demultiplexer DEMUX91 in the unit period UP1014 is "the selection terminal E2, the selection terminal E4, the selection terminal E3, the selection terminal E1".

Please note that the above is just an example. The starting unit period selected in one cycle period can be varied according to actual applications. For example, in another embodiment, the cycle period CP101 may include unit periods UP1012, UP1013, UP1014 and UP1021 (the unit period UP1011 belongs to a previous cycle period not shown), and the cycle period CP102 may include unit periods UP1022.

Based on the above, the common terminals of the demultiplexers DEMUX91-DEMUX96 are respectively coupled to the output terminals of the source driver channels 921-926, the selection terminals E1-E4 of the demultiplexer DEMUX91 are respectively coupled to the data lines R1, R3, R5, and R7, the selection terminals E1-E4 of the demultiplexer DEMUX92 are respectively coupled to the data lines G1, G3, G5, and G7, the selection terminals E1-E4 of the demultiplexer DEMUX93 are respectively coupled to the data lines B1, B3, B5, and B7, the selection terminals E1-E4 of the demultiplexer DEMUX94 are respectively coupled to the data lines R2, R4, R6 and R8, the selection terminals E1-E4 of the demultiplexer DEMUX95 are respectively coupled to the data lines G2, G4, G6 and G8, and the selection terminals E1-E4 of the demultiplexer DEMUX96 are respectively coupled to the data lines B2, B4, B6 and B8. Based on the switching operation of the demultiplexer, the multiple data lines with the same color attribute can share the same source driver channel of the source driver 920. Therefore, the total number of the source driver channels of the source driver 920 can be effectively reduced. Another advantage is that this arrangement can have the demultiplexer stay at the same data line as switching between two adjacent unit periods which improves color uniformity.

It should be noted that the selection terminals E1 to E4 of the demultiplexers DEMUX91 to DEMUX96 are only examples. The number of selection terminals of one demultiplexer may vary according to actual design and application. For example, in another embodiment, the number of the selection terminals of one demultiplexer may be 2, 3 or more. Assuming that the number of selection terminals of the demultiplexers DEMUX91~DEMUX96 is 2, that is, each demultiplexer includes selection terminals E1 and E2, then a possible configuration for the selection terminals E1 and E2 of demultiplexer DEMUX91 may be coupled to the data lines R1 and R3 respectively, for the selection terminals E1 and E2 of demultiplexer DEMUX92 may be coupled to the data lines G1 and G3 respectively, for the selection terminals E1 and E2 of demultiplexer DEMUX93 may be coupled to the data lines B1 and B3 respectively, for the selection terminals E1 and E2 of demultiplexer DEMUX94 may be coupled to the data lines R2 and R4 respectively, for the selection terminals E1 and E2 of demultiplexer DEMUX95 may be coupled to the data lines G2 and G4 respectively, and for the selection terminals E1 and E2 of demultiplexer DEMUX96 may be coupled to the data lines B2 and B4 respectively. Based on appropriate switching operation, the demultiplexer can stay at the same data line as switching between two adjacent unit periods which improves color uniformity.

Although the disclosure has been disclosed above through embodiments, the embodiments are not intended to limit the disclosure. Persons with ordinary knowledge in the relevant technical field may make some changes and modifications without departing from the spirit and scope of the disclosure. Therefore, the protection scope of the disclosure shall be determined by the appended claims.

What is claimed is:

1. A display device comprising:

a source driver comprising a first source driver channel;

a display panel comprising a plurality of first data lines corresponding to the first source driver channel;

a first demultiplexer comprising a common terminal and a plurality of selection terminals, wherein the common terminal of the first demultiplexer is coupled to an output terminal of the first source driver channel, each of the selection terminals of the first demultiplexer is coupled to a corresponding one of the first data lines, each of the first data lines has a corresponding one of color attributes, and the color attributes of at least two of the first data lines coupled to the first demultiplexer are a first color; and a controller controlling the first demultiplexer to select each of the selection terminals once in a unit period, wherein the first demultiplexer continuously selects the first data lines with the first color in the unit period, wherein a plurality of consecutive unit periods are defined as a cycle period, the first demultiplexer has same demultiplexing sequence in different cycle periods of a frame period, the cycle period comprises a first unit period and a second unit period, a first boundary of the first unit period is temporally adjacent to a second boundary of the second unit period, only one of the first data lines coupled to the first demultiplexer has a color attribute of a second color, and the first demultiplexer continuously selects the first data line with the color attribute of the second color at the first boundary of the first unit period and the second boundary of the second unit period, and wherein the cycle period further comprises a third unit period and a fourth unit period, and the demultiplexing sequences of the first demultiplexer in the first unit period, the second unit period, the third unit period and the fourth unit period are different.

2. The display device as claimed in claim 1, wherein the source driver further comprises a second source driver channel and a polarity switching circuit, and the display device further comprises:

a second demultiplexer, wherein the second source driver channel and the first source driver channel have different polarities, the display panel comprises a plurality of second data lines corresponding to the second source driver channel, the second data lines are different from the first data lines, a first input terminal of the polarity switching circuit is coupled to the output terminal of the first source driver channel, a second input terminal of the polarity switching circuit is coupled to an output terminal of the second source driver channel, a first output terminal of the polarity switching circuit is coupled to the common terminal of the first demultiplexer, a common terminal of the second demultiplexer is coupled to a second output terminal of the polarity switching circuit, and each of a plurality of selection terminals of the second demultiplexer is coupled to a corresponding one of the second data lines.

3. The display device as claimed in claim 2, wherein:

in response to the display panel operating in a first polarity configuration, the common terminal of the first demultiplexer is coupled to the output terminal of the first source driver channel through the polarity switching circuit, and the common terminal of the second demultiplexer is coupled to the output terminal of the second source driver channel through the polarity switching circuit; and in response to the display panel operating in a second polarity configuration, the common terminal of the first demultiplexer is coupled to the output terminal of the second source driver channel through the polarity switching circuit, and the common terminal of the second demultiplexer is coupled to the output terminal of the first source driver channel through the polarity switching circuit.

4. The display device as claimed in claim 1, wherein the selection terminals of the first demultiplexer comprise a first selection terminal, a second selection terminal, and a third selection terminal, the first selection terminal is coupled to a first line among the first data lines with the color attribute as the first color, the second selection terminal is coupled to a second line among the first data lines with the color attribute as the first color, and the third selection terminal is coupled to a third line among the first data lines with the color attribute as the second color.

5. The display device as claimed in claim 1, wherein the first demultiplexer has different demultiplexing sequences in different frame periods.

6. The display device as claimed in claim 1, wherein the first demultiplexer has different demultiplexing sequence in each of the unit periods.

7. The display device as claimed in claim 1, wherein a third boundary of the second unit period is temporally adjacent to a fourth boundary of the third unit period, only one of the first data lines coupled to the first demultiplexer has a color attribute of a third color, and the first demultiplexer continuously selects the first data line with the color attribute of the third color at the third boundary of the second unit period and the fourth boundary of the third unit period.

8. The display device as claimed in claim 7, wherein the selection terminals of the first demultiplexer comprise a first selection terminal, a second selection terminal, a third selection terminal, and a fourth selection terminal, the first selection terminal is coupled to a first line among the first data lines with the color attribute as the first color, the second selection terminal is coupled to a second line among the first data lines with the color attribute as the second color, the third selection terminal is coupled to a third line among the first data lines with the color attribute as the third color, and the fourth selection terminal is coupled to a fourth line among the first data lines with the color attribute as the first color.

9. The display device as claimed in claim 1, wherein all of the color attributes of the first data lines coupled to the first demultiplexer are the first color.

10. The display device as claimed in claim 9, wherein the selection terminals of the first demultiplexer comprise a first selection terminal, a second selection terminal, a third selection terminal, and a fourth selection terminal, and the first demultiplexer has different demultiplexing sequence in each of the unit periods.

11. The display device as claimed in claim 1, wherein the unit period is equivalent to a scan line period.

12. A driver circuit comprising:

a first source driver channel configurable to be coupled to a first demultiplexer and output a plurality of pixel data to the first demultiplexer, wherein a group of pixel data comprising at least two pixel data of a first color is outputted to the first demultiplexer in a unit period, and the first demultiplexer comprises a plurality of selection terminals and is controlled to select each of the selection terminals once in the unit period; and a controller controlling the first demultiplexer to output the group of pixel data to data lines of a display panel, wherein the first demultiplexer is controlled to continuously output the pixel data of the first color to the data lines in the unit period, wherein a plurality of consecutive unit periods are defined as a cycle period, the first demultiplexer has same demultiplexing sequence in different cycle periods of a frame period, the cycle period comprises a first unit period and a second unit period, a first boundary of the first unit period is temporally adjacent to a second boundary of the second unit period, only one of the first data lines coupled to the first demultiplexer has a color attribute of a second color, and the first demultiplexer continuously selects the first data line with the color attribute of the second color at the first boundary of the first unit period and the second boundary of the second unit period, wherein the cycle period further comprises a third unit period and a fourth unit period, and the demultiplexing sequences of the first demultiplexer in the first unit period, the second unit period, the third unit period and the fourth unit period are different.

13. The driver circuit as claimed in claim 12, further comprising:

a second source driver channel, wherein the second source driver channel and the first source driver channel have different polarities; and a polarity switching circuit, wherein a first input terminal of the polarity switching circuit is coupled to an output terminal of the first source driver channel, a second input terminal of the polarity switching circuit is coupled to an output terminal of the second source driver channel, a first output terminal of the polarity switching circuit is coupled to a common terminal of the first demultiplexer, and a common terminal of a second demultiplexer is coupled to a second output terminal of the polarity switching circuit.

14. The driver circuit as claimed in claim 13, wherein:

in response to the display panel operating in a first polarity configuration, the common terminal of the first demultiplexer is coupled to the output terminal of the first source driver channel through the polarity switching circuit, and the common terminal of the second demultiplexer is coupled to the output terminal of the second source driver channel through the polarity switching circuit; and in response to the display panel operating in a second polarity configuration, the common terminal of the first demultiplexer is coupled to the output terminal of the second source driver channel through the polarity switching circuit, and the common terminal of the second demultiplexer is coupled to the output terminal of the first source driver channel through the polarity switching circuit.

15. The driver circuit as claimed in claim 12, wherein the unit period is equivalent to a scan line period.

16. A driving method of a display panel, wherein the display panel comprises a plurality of first data lines corresponding to a first source driver channel of a source driver, each of the first data lines has a corresponding one of color attributes, the driving method comprising:

continuously selecting, by a first demultiplexer, the first data lines with same color attribute as a first color in a unit period, wherein the first demultiplexer comprises a common terminal and a plurality of selection terminals, the common terminal of the first demultiplexer is coupled to an output terminal of the first source driver channel, each of the selection terminals of the first demultiplexer is coupled to a corresponding one of the first data lines, the color attributes of at least two of the first data lines coupled to the first demultiplexer are the first color, and the first demultiplexer selects each of the selection terminals once in the unit period, wherein a plurality of consecutive unit periods are defined as a cycle period, the first demultiplexer has same demultiplexing sequence in different cycle periods of a frame period, the cycle period comprises a first unit period and a second unit period, a first boundary of the first unit period is temporally adjacent to a second boundary of the second unit period, only one of the first data lines coupled to the first demultiplexer has a color attribute of a second color, and the driving method further comprising:

continuously selecting, by the first demultiplexer, the first data line with the color attribute of the second color at the first boundary of the first unit period and the second boundary of the second unit period, wherein the cycle period further comprises a third unit period and a fourth unit period, and the demultiplexing sequences of the first demultiplexer in the first unit period, the second unit period, the third unit period and the fourth unit period are different.

17. The driving method as claimed in claim 16, wherein the selection terminals of the first demultiplexer comprise a first selection terminal, a second selection terminal, and a third selection terminal, the first selection terminal is coupled to a first line among the first data lines with the color attribute as the first color, the second selection terminal is coupled to a second line among the first data lines with the color attribute as the first color, and the third selection terminal is coupled to a third line among the first data lines with the color attribute as the second color.

18. The driving method as claimed in claim 16, wherein the first demultiplexer has different demultiplexing sequences in different frame periods.

19. The driving method as claimed in claim 16, wherein the first demultiplexer has different demultiplexing sequence in each of the unit periods.

20. The driving method as claimed in claim 16, wherein all of the color attributes of the first data lines coupled to the first demultiplexer are the first color.

21. The driving method as claimed in claim 20, wherein the selection terminals of the first demultiplexer comprise a first selection terminal, a second selection terminal, a third selection terminal, and a fourth selection terminal, and the first demultiplexer has different demultiplexing sequence in each of the unit periods.

22. The driving method as claimed in claim 16, wherein the unit period is equivalent to a scan line period.

23. A driving method of a display panel, wherein the display panel comprises a plurality of first data lines corresponding to a first source driver channel of a source driver, each of the first data lines has a corresponding one of color attributes, the driving method comprising:

continuously selecting, by a first demultiplexer, the first data lines with same color attribute as a first color in a unit period, wherein the first demultiplexer comprises a common terminal and a plurality of selection terminals, the common terminal of the first demultiplexer is coupled to an output terminal of the first source driver channel, each of the selection terminals of the first demultiplexer is coupled to a corresponding one of the first data lines, the color attributes of at least two of the first data lines coupled to the first demultiplexer are the first color, and the first demultiplexer selects each of the selection terminals once in the unit period, wherein a plurality of consecutive unit periods are defined as a cycle period, the first demultiplexer has same demultiplexing sequence in different cycle periods of a frame period, a first cycle period comprises a first unit period and a second unit period, a second cycle period comprises a third unit period and a fourth unit period, a first boundary of the first unit period is temporally adjacent to a second boundary of the second unit period, a third boundary of the second unit period is temporally adjacent to a fourth boundary of the third unit period, and the driving method further comprising:

continuously selecting, by the first demultiplexer, the first data line with the color attribute of a second color at the first boundary of the first unit period and the second boundary of the second unit period, wherein only one of the first data lines coupled to the first demultiplexer has a color attribute of the second color; and continuously selecting, by the first demultiplexer, the first data line with the color attribute of a third color at the third boundary of the second unit period and the fourth boundary of the third unit period, wherein only one of the first data lines coupled to the first demultiplexer has a color attribute of the third color.

24. The driving method as claimed in claim 23, wherein the selection terminals of the first demultiplexer comprise a first selection terminal, a second selection terminal, a third selection terminal, and a fourth selection terminal, the first selection terminal is coupled to a first line among the first data lines with the color attribute as the first color, the second selection terminal is coupled to a second line among the first data lines with the color attribute as the second color, the third selection terminal is coupled to a third line among the first data lines with the color attribute as the third color, and the fourth selection terminal is coupled to a fourth line among the first data lines with the color attribute as the first color.

* * * * *